United States Patent [19]
Mittelmeier et al.

[11] 3,894,297
[45] July 15, 1975

[54] HIP JOINT PROSTHESIS

[75] Inventors: Heinz Mittelmeier, Homburg, Germany; Kurt Karpf, Holderbank; Heinz Moser, Selzach, both of Switzerland

[73] Assignee: Oscobal AG, Chirurgische Instruments und Implantate, Selzach, Switzerland

[22] Filed: Mar. 11, 1974

[21] Appl. No.: 450,163

[30] Foreign Application Priority Data
Aug. 31, 1973 Switzerland.................... 12525/73

[52] U.S. Cl................... 3/1; 128/92 C; 128/92 CA
[51] Int. Cl.............................................. A61f 1/24
[58] Field of Search..... 3/1; 128/92 C, 92 CA, 92 R

[56] References Cited
UNITED STATES PATENTS

| 2,765,787 | 10/1956 | Pellet | 128/92 CA |
|---|---|---|---|
| 2,910,978 | 11/1959 | Urist | 128/92 C |
| 3,584,318 | 6/1971 | Scales et al. | 3/1 |
| 3,685,058 | 8/1972 | Tronzo | 3/1 |
| 3,698,017 | 10/1972 | Scales et al. | 3/1 |

FOREIGN PATENTS OR APPLICATIONS

| 1,215,737 | 12/1970 | United Kingdom | 128/92 C |
|---|---|---|---|
| 2,096,895 | 3/1972 | France | 128/92 C |
| 1,047,640 | 7/1953 | France | 128/92 C |
| 1,122,634 | 5/1956 | France | 128/92 CA |

OTHER PUBLICATIONS

"Complete Replacement Arthroplasty of the Hip by the Ring Prosthesis," by P. A. Ring, The Journal of Bone and Joint Surgery, British Vol. 50B, No. 4, Nov. 1968, pp. 720–731.

"A Metallic Femoral Head Prosthesis for the Hip Joint," by Earl D. McBride, Reprint from The Journal of the International College of Surgeons, Vol. XV, April 1951, No. 4, pp. 498–503.

*Primary Examiner*—Ronald L. Frinks
*Attorney, Agent, or Firm*—Imirie, Smiley & Linn

[57] ABSTRACT

The present invention relates to a joint prosthesis comprising a substantially frustoconical acetabulum member provided with supporting ribs in the form of a tapering thread and a prosthesis shaft provided with circular supporting ribs allowing anchorage of the prosthesis and the acetabulum member without using a cement or other adhesive.

12 Claims, 4 Drawing Figures

3,894,297
FIG.1
FIG.3
FIG.2
FIG.4
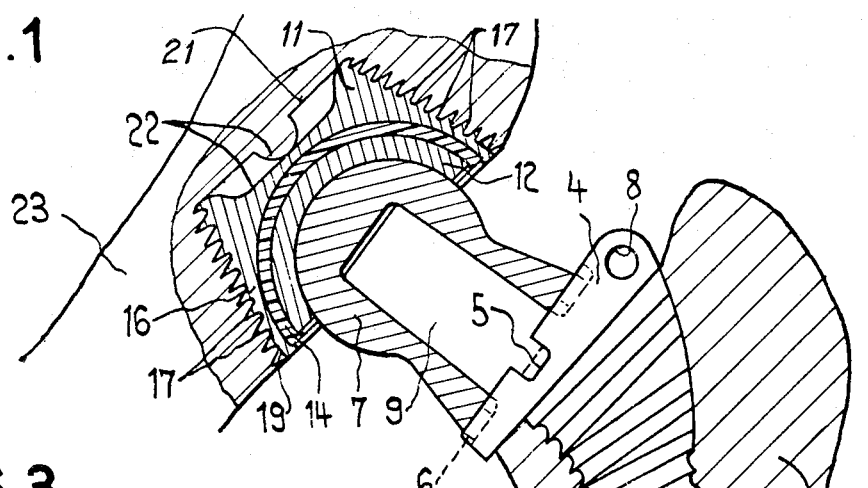
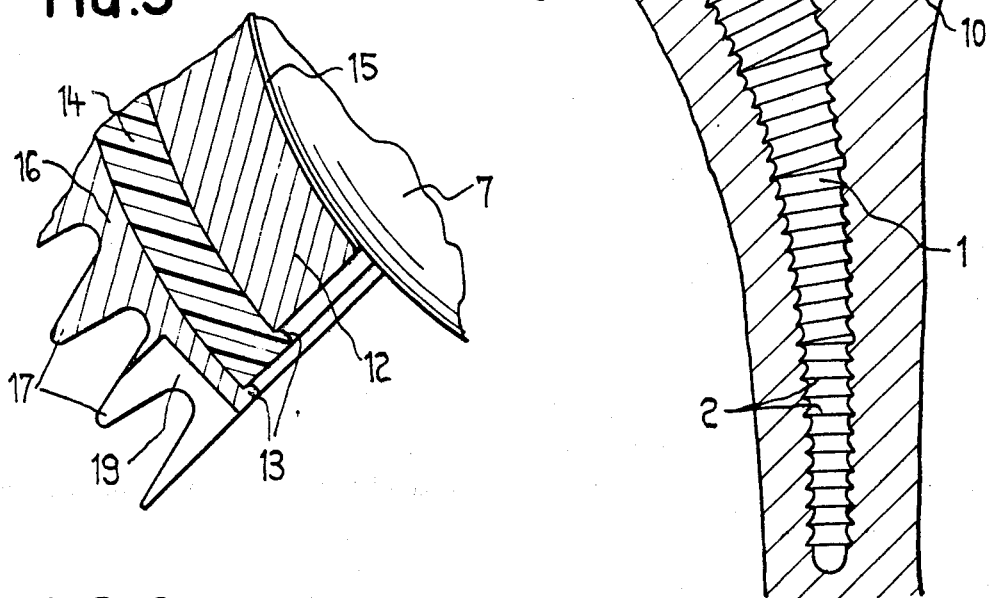
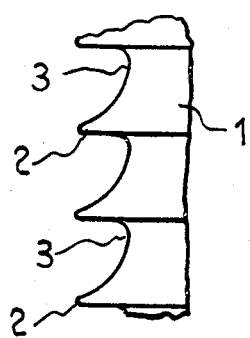
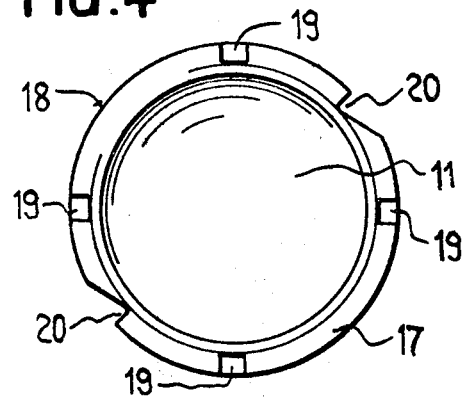

HIP JOINT PROSTHESIS

BACKGROUND OF THE INVENTION

The present invention relates to a hip joint prosthesis which can be secured in position without using a cement or other adhesive.

Prosthesis for the replacement of hip joints are already known. Originally, only the ball-end on the head of the femur could be replaced, but it has since proved possible to replace either part of the hip joint, that is to say, that acetabulum or the ball-end on the head of the femur.

When the replacement of only one part of the joint is necessary, an operation can be satisfactorily carried out using conventional materials and prosthesis designs.

If, however, for medical reasons both parts of the joint have to be replaced, certain problems arise which have hitherto not been satisfactorily solved.

The greatest problem has proved to be the anchoring of the hip joint prosthesis. The first prosthesis had inadequate anchorage, since the contacting surfaces of the prosthesis were not designed to cope with stresses on the joint. This resulted in resorption phenomena at the base of the head of the femur. This caused the prosthesis to sink further into the femur and loosening in the region of the shaft of the prosthesis.

In order to surmount this disadvantage, it was proposed to anchor the prosthesis in position by means of a bone cement. This latter usually consisted of methyl methacrylate. This suggestion did not affect the simplicity of the operation and had the advantage that immediate load stability on the artificial joint was achieved.

However, serious disadvantages soon became apparent in the use of this cement. Firstly, damage was caused to the tissue of the patient by heating to set the cement during the operation. Temperatures up to 120°C were necessary. Moreover, the synthetic cement was introduced into the patient an acute drop in blood pressure occurred, which was due to the toxic effect of low molecular weight polymeric substances.

In addition, a reaction caused by foreign bodies on the surface of the cement lead to a limitation of the strength of bonding of the bone tissue with the cement. Bone resorption phenomena also occurred which lead to loosening of the seating of the prosthesis. Fractures of the cement casing were also observed, as a consequence of the ageing of the cement.

SUMMARY OF THE INVENTION

It is therefore an object of the present invention to provide a prosthesis in which the artificial hip joint can be anchored without the use of a cement and in which resorption phenomena no longer occur.

According to the present invention, there is provided an artificial hip joint prosthesis, comprising a prosthesis shaft, a ball head and an acetabulum member wherein the acetabulum member is provided with support ribs.

In addition, known prosthesis designs have disadvantages caused by friction and attrition. In the case of metal/metal prosthesis, the friction therebetween is excessive, and this eventually leads to corrosion of part of the bearing surfaces. In the case of metal/plastics material combinations, the friction is reduced wearing of the plastics material may be observed.

Consequently, it is a preferred object to reduce the friction between ball and socket components of the prosthesis. Accordingly, it is preferable to use aluminium oxide ceramic materials for the bearings surfaces. Ceramic materials not only have excellent compatibility with body tissue, but also a pressure load bearing capacity which is even greater than that of metal. Above all, the bearing surfaces can be made extremely smooth.

The invention will be further described, by way of example with reference to the accompanying drawings.

BRIEF DESCRIPTION OF THE DRAWING

FIG. 1 is a cross-sectional view of a complete prosthesis according to this invention, in position, as a hip joint, FIG. 2 shows a portion of the shaft of the prosthesis on an enlarged scale relative to FIG. 1.

FIG. 3 shows a portion of the acetabulum on an enlarged scale, relative to FIG. 1. and FIG. 4 shows an underneath plan view of the acetabulum.

DESCRIPTION OF THE PREFERRED EMBODIMENTS

The prosthesis comprises a shaft 1, the length of which is selected in dependence upon the bone structure of the recipient and the required strength of the prosthesis. The shaft 1 is provided with circular supporting ribs 2 which serve to anchor the prosthesis in position and reduce the specific pressure of the shaft on a bone 10.

The ribs 2 are given the form of the threaded profile of a bone screw in order to permit the bone 10 to grow thereinto in a satisfactory manner. Additionally, the ribs 2 are provided with a rounded portion 3, as best seen in FIG. 2, in order to avoid notching. The shaft 1 has a collar 4 which is provided with four recesses 5. These recesses 5 receive pins 6 formed on a removable ball head 7 of ceramic material. The collar 4 is also provided with a bore 8 for receiving an encircling wire which may also be used for extraction of the shaft 1 if desired. A taper pin 9, which is capable of receiving the ball head 7 is fixedly mounted at a predetermined angle on or made integral with, the collar 4

The insertion of the prosthesis shaft into the recipient is effected in a known manner by means of a special rasp and milling cutter. An acetabulum member 11 which is dish-shaped or substantially frusto-conical, as may be seen most clearly in FIG. 4, is located in the acetabulum, and a cap-shaped joint surface 12, made of ceramic material forms the innermost part of the member 11, and receives and guides the ball head 7. This ceramic cap 12 is affixed to a plastic casing 14 which is snap-fitted thereon by means of a bead 13, and has slots 15 formed therein through which synovial fluid can penetrate and wet the surfaces of the joint. The plastic casing 14 is affixed to the part 16 of the acetabulum member 11 by the same snap mechanism 13, and has an impact damping effect which compensates for the very hard ceramic surfaces of the joint. The part 16 of the acetabulum member is also provided with support ribs 17. However, in order to simplify fitting of the artificial joint these ribs are not made circular, but instead are given the form of a tapering thread. The shape of the ribs is preferably made similar to the threaded profile of bone screws. The acetabulum member is provided, on its circumference 18, as shown in FIG. 4 with four slots 19 into which an adjusting tool can be inserted (not shown). A plurality of grooves 20 are also cut into the circumference of the member only two grooves being shown. By means of these slots and grooves the acetabulum member can be fitted into a patient in a simple manner. Firstly, a hole, having a diameter of the core of the acetabulum member, is drilled in the pelvis 23 of the patient. The acetabulum member is then screwed into this hole. The acetabulum member is rotated by means of an adjusting tool engaging in the slots 19, and this rotation causes the grooves 20 to cut a thread in the pelvic bone. It is therefore not necessary to cut a thread in the pelvic bone before insertion of the acetabulum member. To prevent this member from twisting once it is in position, the front surface 21 of the acetabulum member is provided with notches 22.

Both the shaft 1 and the acetabulum member 16 are preferably made from a Cr-Co-Mo alloy. In order to increase the retention of the device in the bone, the support ribs of the shaft and of the acetabulum member may be coated with a ceramic material.

Various minor modifications may be made to the embodiment that has been described. Thus various of the features of the device may be designed differently, for example, the support ribs provided on the shaft may have different shapes. Thus, the circular ribs may also be corrugated and may be connected together by vertical connecting members to provide a honeycomb-type structure. The support rings may also be in the form of scales or burls, so as to be similar to the spongy structure of the bone.

The surfaces of the joint may, moreover, be made of metal and/or synthetic material, and the ceramic material may be of the aluminium oxide or any other suitable type.

What we claim is:

1. A hip joint prosthesis, comprising a prosthesis shaft, a ball head on said shaft, and a substantially frusto-conical acetabulum member provided with supporting ribs in the form of a tapering thread about the frusto-conical exterior surface thereof, at least one groove in said exterior surface adapted to cut a thread in the pelvic bone of a patient, such ribs allowing anchorage of said acetabulum member without using cement or other adhesive, said acetabulum member defining a substantially spherical cavity receiving said ball head.

2. A prosthesis as claimed in claim 1, wherein the prosthesis shaft is provided with circular supporting ribs having a rounded portion, said shaft and ribs having a profile corresponding substantially in shape to the threaded profile of a bone screw.

3. A prosthesis as claimed in claim 1, wherein the ball head is made of an aluminium oxide ceramic material.

4. A prosthesis as claimed in claim 1, wherein the acetabulum member is provided with a cap-shaped surface made of an aluminium oxide ceramic material, which cap is retained in position in said cavity by a snap-fitted bead.

5. A prosthesis as claimed in claim 1, wherein the acetabulum member is provided with a synthetic casing which acts as a shock absorber and is retained in position by a bead snap-fitted thereover.

6. A prosthesis as claimed in claim 1, wherein the acetabulum member is provided with at least two grooves, each having a cutting edge, around its circumference.

7. A prosthesis as claimed in claim 1, wherein the acetabulum member is provided with at least two slots on its circumference, which slots are capable of receiving an adjusting tool.

8. A prosthesis as claimed in claim 1, wherein the supporting ribs of the acetabulum member are provided in the form of a tapering thread and the profile thereof corresponds substantially to the threaded profile of a bone screw.

9. A prosthesis as claimed in claim 1, wherein the acetabulum member is provided with notches on its front surface.

10. A prosthesis as claimed in claim 1, wherein the acetabulum member has slots formed therein, which slots, when the prothesis is fitted to a patient, permit the passage of synovial fluid therethrough to wet the surfaces of the joint.

11. A prosthesis as claimed in claim 1, wherein the ball head is detachably located on a pin extending from the shaft and is retained in position by means of pegs engaging in depressions formed in a collar formed on the shaft.

12. A prosthesis as claimed in claim 1, wherein said shaft is provided with supporting ribs and wherein the ribs of the shaft and the acetabulum member are each coated with a layer of ceramic material.

* * * * *